(12) United States Patent
Basto et al.

(10) Patent No.: US 8,418,092 B2
(45) Date of Patent: Apr. 9, 2013

(54) SOURCE-SYNCHRONOUS DATA LINK FOR SYSTEM-ON-CHIP DESIGN

(75) Inventors: Carlos Basto, Santa Clara, CA (US); Jan-Willem Van De Waerdt, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/746,302

(22) PCT Filed: Nov. 27, 2008

(86) PCT No.: PCT/IB2008/054981
§ 371 (c)(1),
(2), (4) Date: Jul. 6, 2010

(87) PCT Pub. No.: WO2009/072038
PCT Pub. Date: Jun. 11, 2009

(65) Prior Publication Data
US 2010/0271084 A1 Oct. 28, 2010

Related U.S. Application Data

(60) Provisional application No. 60/992,710, filed on Dec. 5, 2007.

(51) Int. Cl.
*G06F 17/50* (2006.01)
(52) U.S. Cl.
USPC .......................................................... 716/101
(58) Field of Classification Search .................. 716/100, 716/101
See application file for complete search history.

(56) References Cited

U.S. PATENT DOCUMENTS

| | | | |
|---|---|---|---|
| 7,110,423 | B1 | 9/2006 | Sethuram et al. |
| 2005/0066142 | A1 | 3/2005 | Bhattacharya et al. |
| 2006/0041693 | A1* | 2/2006 | Mangano et al. ............... 710/58 |
| 2006/0044026 | A1 | 3/2006 | Lee et al. |
| 2008/0215786 | A1* | 9/2008 | Goossens et al. ............. 710/243 |

FOREIGN PATENT DOCUMENTS

| | | |
|---|---|---|
| EP | 1 624 635 A2 | 2/2006 |
| GB | 2 342 740 B | 7/2002 |

OTHER PUBLICATIONS

International Search Report and Written Opinion for Application PCT/IB2008/054981 (Jul. 17, 2009).

* cited by examiner

*Primary Examiner* — Suchin Parihar (57) ABSTRACT

A method of producing an integrated circuit (700) using a system-on-chip (SoC) architecture includes providing a first circuit (710) in a first island of synchronicity (IoS); and providing a source-synchronous data link (755/757, 765/767) between the first circuit (710) in the first IoS and a hard core (720) in a second IoS for communicating n-bit data elements between the first circuit (710) and the hard core (720). The source-synchronous data link (755/757, 765/767) includes a set of n data lines (755, 765) for transporting the n-bit data elements between the first circuit (710) and the hard core (720), and a source-synchronous clock line (757, 767) for transporting a source clock between the first circuit (710) and the hard core (720) for clocking the n-bit data elements. The hard core (720) does not include a bus interface adaptor for interfacing with the source-synchronous data link (755/757, 765/767).

18 Claims, 5 Drawing Sheets

SOURCE-SYNCHRONOUS DATA LINK FOR SYSTEM-ON-CHIP DESIGN

This invention pertains to the field of system-on-chip (SoC) design and integrated circuits produced by SoC design, and more particularly to an SoC design method for interfacing a memory subsystem and a hard core using a source-synchronous data link, and an IC produced by such a design method.

System on Chip (SoC) design is a popular and pervasive method of producing integrated circuits. The use of pre-designed and pre-verified hardware modules, also called IP cores, in SoC design an important part of the effort to design and implement complex systems.

As recognized in the art, a soft IP core or "soft core" is a block of digital logic that is designed to be implemented, in general, in an application specific integrated circuit (ASIC) or field programmable gate array (FPGA) chip. A soft core is typically delivered using a Register Transfer Level (RTL) hardware description language (HDL), which defines logic at a higher level than a hard core, which is defined at the gate level. The most popular RTL languages are very high scale integrated circuit hardware description language (VHDL) and Verilog hardware description language. Occasionally, soft cores are delivered as gate-level netlists or schematics rather than RTL. For ASIC chips, during the SoC design phase the RTL soft core and other RTL associated with the design are synthesized into a gate-level netlist. Based on the netlist, the logic gates are placed and routed and then turned into photomasks to make the chip. The ultimate realization of the soft core is hardwired logic gates formed of transistors and their interconnections. With FPGAs, the resulting netlist is used to generate a configuration file that will be used to program the lookup tables and configurable logic blocks inside the device. Soft cores are flexible and portable; because they are not process-specific, you can use them on chips redesigned for process migration or for multiple sourcing of the same process. One drawback of soft cores is that their performance is not "solid"; implementing in different processes can result in performance variations.

Meanwhile, a hard IP core or "hard core" is block of digital logic that is designed to be implemented in an ASIC or FPGA chip. For ASIC chips, a hard core is delivered as logic gates in which their physical locations relative to each other and their interconnections are predefined. A hard core has a fixed layout for a specific process, or is available in netlist format with placement and routing information. A hard core is treated as a "black box" by the place-and-route software that processes the entire design. The location of the hard core as a whole may be determined by the software, but the hard core's internal contents are "locked down." With FPGAs, hard cores are already physically implemented as hardwired blocks embedded into the FPGA's fabric. Lacking soft-core flexibility, hard cores have well-known performance characteristics, including fixed cell placement and internal interconnections.

Figure 1:
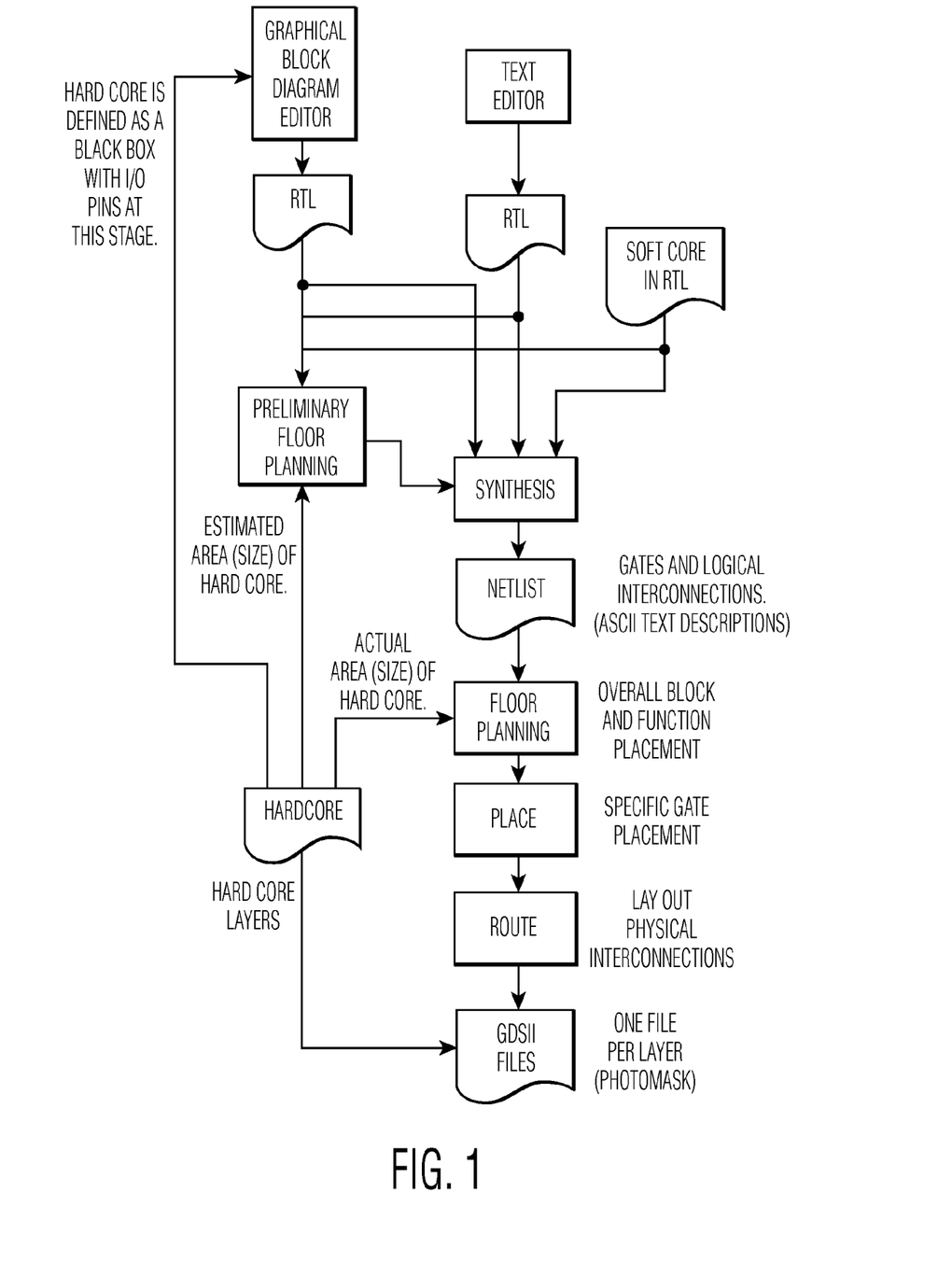
FIG. 1 illustrates a system on chip (SoC) development process.

FIG. 1 is a diagram that illustrates an SoC development process using soft cores and hard cores as described above. In general, as illustrated in FIG. 1, SoC design will employ one or more hard cores combined with one or more soft cores, together with custom-designed circuits produced from user-defined logic to efficiently facilitate design and fabrication of complex systems on an integrated circuit.

The increasing complexity of large scale SoC design requires techniques to address the physical design steps or "back-end" steps: placement, routing, and timing closure. The use of Islands of Synchronicity (IoS) is one of these techniques. Using IoS, a large SoC is partitioned into several "islands" of circuitry that can be time-closed independently. That is, an IoS can be defined as a portion of an integrated circuit that operates in synchronization based on a same clock, but which runs on a different clock from the rest of the integrated circuit. There are no synchronous interconnections between any two IoS, or "clock domains," and therefore no global clock balancing is required.

Also, in order to address the power consumption requirements of the battery-operated market, an island can have its own power switch. Under these circumstances, an IoS is also an Island of Power (IoP). That is, an IoP can be defined as a portion of an integrated circuit that operates on a same power, but which runs on a different power from the rest of the integrated circuit. An IoP can have its power turned off completely. Communication of signals between multiple IoP or "power domains" requires the insertion of level shifters (and/or clamps) on the signals crossing power domains.

However, the IoS technique poses some challenges in the communication between islands. In particular, when a memory subsystem is located in one IoS, and a circuit that accesses the memory subsystem (e.g., a processor) is in a different, second IoS, then certain issues arise. A non-synchronous communication link is required between IoS to avoid the need for a globally synchronous clock. Furthermore, it is desirable to provide a data link architecture that simplifies the timing closure constraints. Also, it is generally desirable to minimize the number of top level wires that must be routed between islands. Moreover, in many cases latency is an issue and there is a need to provide a data link that operates with low latency.

Accordingly, it would be desirable to provide a method of producing an integrated circuit using a system-on-chip (SoC) architecture that includes a low latency data link between islands of synchronicity that does not require a globally synchronous clock. It would further be desirable to provide a monolithic structure that includes a hard core connected to an external circuit though a low latency data link that does not require a globally synchronous clock.

In one aspect of the invention, a method for producing an integrated circuit uses a system-on-chip (SoC) architecture. The method comprises: providing a first circuit in a first island of synchronicity (IoS) of an integrated circuit associated with a first clock; and providing a source-synchronous data link between the first circuit of the first IoS and a hard core in a second IoS of the integrated circuit associated with a second clock that is not synchronized with the first clock. The source-synchronous data link communicates n-bit data elements between the first circuit and the hard core. The source-synchronous data link comprises a set of n data lines for transporting the n-bit data elements between the first circuit and the hard core, and a source-synchronous clock line for transporting a source clock between the first circuit and the hard core for clocking the n-bit data elements. The hard core does not include a bus interface adaptor for interfacing with the source-synchronous data link.

In another aspect of the invention, a monolithic device comprises: a first circuit operating with a first clock, a second circuit embodied as a hard core operating with a second clock that is not synchronized with the first clock, and a source-synchronous data link between the first circuit and the second circuit for communicating n-bit data elements between the first circuit and the second circuit. The source-synchronous data link comprises a set of n data lines for transporting the n-bit data elements between the first circuit and the second circuit, and a source-synchronous clock line for transporting a source clock between the first circuit and the second circuit for clocking the n-bit data elements. The hard core does not include a bus interface adaptor for interfacing with the source-synchronous data link.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

One type of communication link that does not require a globally synchronous clock is an asynchronous data link.

Figure 2:
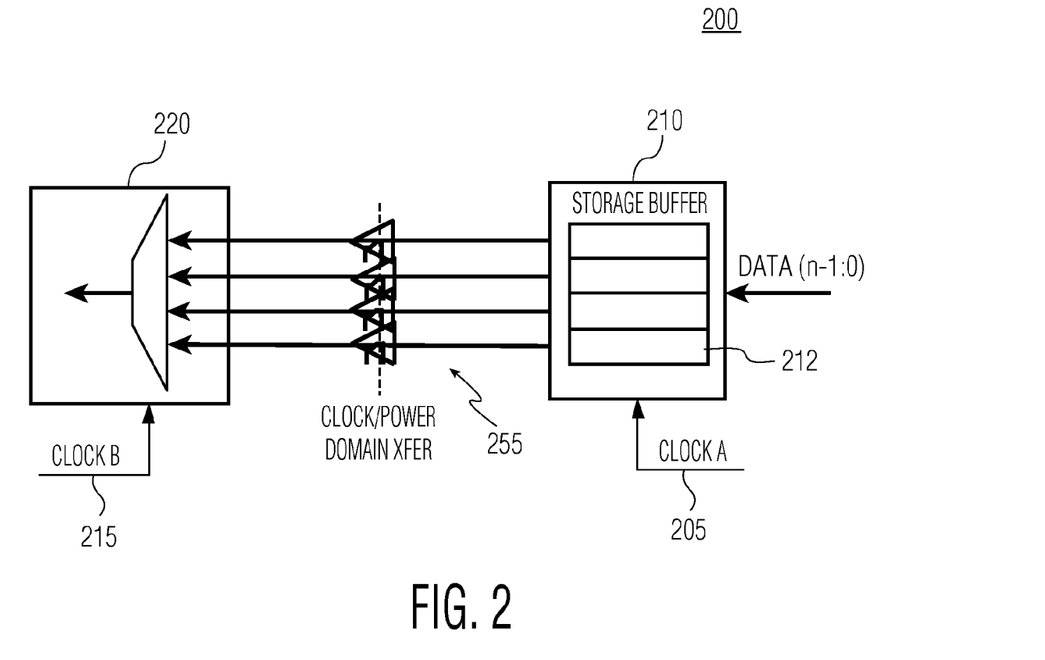
FIG. 2 illustrates an exemplary embodiment of a device having an asynchronous data link.

FIG. 2 illustrates an exemplary embodiment of a device 200 having an asynchronous data link 255. FIG. 2 shows the flow of data between source block 210 and destination block 220 that operate in different clocks domains and power domains. Source block 210 is clocked by source clock "A" 205, and destination block 220 is clocked by destination clock "B" 215.

For explanation, consider a case of one transaction transferring 4 elements of n bits from source block 210 to destination block 220. In that case, all 4*n bits of data are stored in buffer 212 at the source side in source block 210, and clocked out by source clock "A" 205. In the asynchronous link 255, all 4 data element cross the clock/power domains. Signals crossing power domains need to go through level shifters, as depicted in FIG. 2. This results in a total number of 4*n top-level wires (for 4 n-bit buffer entries). With the asynchronous data link 255, the number of top-level wires scales upward with the number of data elements transferred in a single transaction. In the case of a central processing unit (CPU) accessing data elements from memory, the number of elements per transaction is usually one cache line, which may be hundreds of bytes. In that case, asynchronous data link 255 must include several hundred lines. Also, with respect to the timing closure constraints, for the asynchronous data link 255 data crossing domains should be treated as multiple cycle paths with respect to destination clock "B" 215.

The performance of latency sensitive devices (e.g. CPUs) depends on the overall delay of its memory subsystem. When latency sensitive devices operate on a different clock than the memory subsystem, a clock domain crossing is required. A clock domain crossing adds extra delay on the communication to the memory subsystem. In order to minimize this extra delay, the clock domain crossing may be performed inside the hard core that contains the latency sensitive device itself (CPU).

Figure 3:
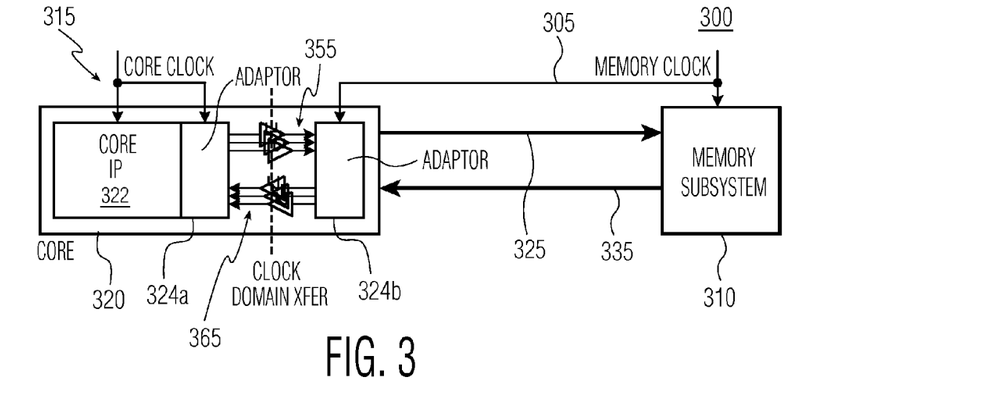
FIG. 3 illustrates an exemplary embodiment of a monolithic device employing an SoC design where a clock domain crossing is performed inside of a hard core using an asynchronous data link.

FIG. 3 illustrates an exemplary embodiment of a monolithic device 300 employing an SoC design where clock domain crossing is performed inside of a hard core 320 using asynchronous data links 355 and 365. Device 300 includes memory subsystem 310 and hard core 320. Hard core 320 includes a core IP element 322, which in one embodiment, may comprise a CPU. Memory subsystem 310 and core IP 322 operate in different clock domains and power domains. Memory subsystem 310 is clocked by memory clock 305, and core IP 322 is clocked by core clock 315.

Accordingly, hard core 320 also includes a bus adaptor, including a first adaptor component 324a in the same clock and power domain as core IP 322, and a second adaptor component 324b in the same clock and power domain as memory subsystem 310. Asynchronous data links 355 and 365 extend in opposite directions between first and second bus adaptor components 324a and 324b. Bus adaptor 324 serves a function of interfacing a specific bus structure presented by core IP 322 to operate with a general bus structure that may be utilized by device 300 for interfacing with memory subsystem 310. Each asynchronous data link 355/365 includes a total of M*n lines, where M is the number of data elements (e.g., 256) that are transferred between memory subsystem 310 and core IP element 322 in a single transaction, and n is the number of bits (e.g., 8) for each data element. Also, as core IP element 322 and memory subsystem 310 are in different power domains, each asynchronous data link 355/365 includes a level shifter for each of the M*n lines.

Device 300 also includes synchronous data links 325 and 335 between memory subsystem 310 and hard core 320.

There are, however, a few disadvantages with device 300.

First, with respect to the physical design process (placement, routing and timing closure), as data links 325/335 between hard core 320 and memory subsystem 310 are synchronous, global clock balancing is required (memory clock 305 feeds into both hard core 320 and memory subsystem 310).

Second, as bus adaptor 324 is part of hard core 320, the ability to re-use the same hard core 320 in another SoC with different requirements may require an extra level of protocol adaptation. Furthermore, different SoC may have different requirements in terms of power consumption. In some cases, it may be desirable to have core IP 322 and memory subsystem 310 operating on the same power domain and therefore level shifters are not needed. In this case, the level shifters in hard core 320 would be unnecessary, but would still occupy space in the resulting monolithic device. As bus adaptor 324a/324b that is responsible for the clock and power domain crossing is inside hard core 320, this approach is neither protocol friendly nor flexible.

To address the protocol friendliness and flexibility issues, the bus adaptor may be moved outside hard core 320.

Figure 4:
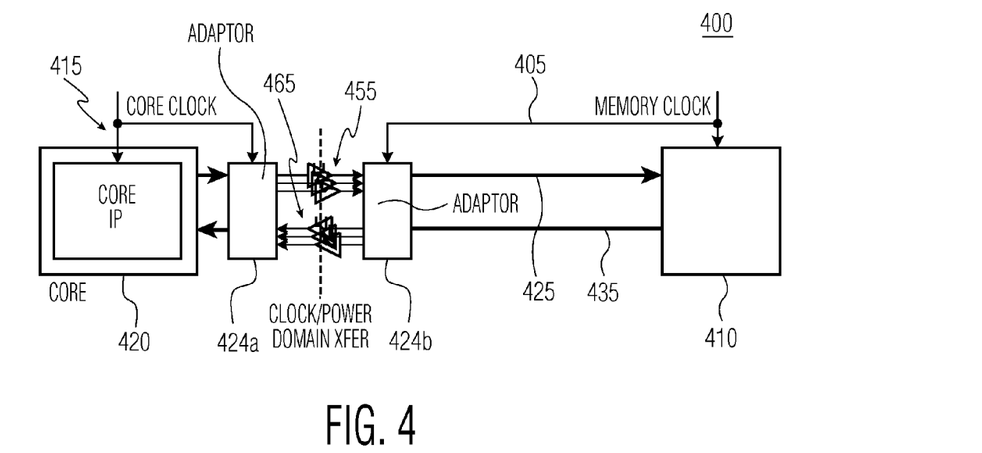
FIG. 4 illustrates an exemplary embodiment of a monolithic device employing an SoC design where a clock domain crossing is performed outside of a hard core using an asynchronous data link.

FIG. 4 illustrates an exemplary embodiment of a monolithic device 400 employing an SoC design where clock domain crossing is performed outside of a hard core 420 using asynchronous data links 455 and 465. Device 400 includes memory subsystem 410, hard core (e.g., a CPU) 420, bus adaptor including a first bus adaptor component 424a and a second bus adaptor component 424b, and asynchronous data links 455 and 465 extending between first and second bus adaptor components 424a and 424b. Memory subsystem 410 and second bus adaptor component 424b operate in a different clock domain and a different power domain than hard core 420 and first bus adaptor component 424a. Memory subsystem 410 and second bus adaptor component 424b are clocked by memory clock 405, while hard core 420 and first bus adaptor component 424a are clocked by core clock 415.

Bus adaptor 424a/424b serves a function of interfacing a specific bus structure presented by hard core (e.g., a CPU) 420 to operate with a general bus structure that may be utilized in SoC design 400. Each asynchronous data link 455/465 includes a total of M*n lines, where M is the number of data elements (e.g., 256) that are transferred between memory subsystem 310 and core IP element 322 in a single transaction, and n is the number of bits (e.g., 8) for each data element. Also, each asynchronous data link 455/465 includes a level shifter for each of the M*n lines.

Device 400 also includes synchronous data links 425 and 435 between memory subsystem 410 and second bus adaptor component 424b.

With this approach, bus adaptor 424a/424b is delivered as a soft cores (i.e., separated from hard core 420). Different bus adaptors can be employed to handle SoC-specific protocol adaptations without adding any extra latency. So the same hard core 420 can be connected to different memory subsystems. Furthermore, rather than having the M*n level shifters in hard core 420, this approach puts them in bus adaptor 424a/424b such that they may be eliminated when not needed by a particular device 400 (e.g., when hard core 420 and memory subsystem 410 operate in the same power domain).

There are, however, a few disadvantages with the SoC design of device 400. Asynchronous data links 455/465 still have lots of top-level wires crossing clock and power domains. Furthermore, the timing constraints imposed by asynchronous data links 455/465 may be difficult to meet, particularly if hard core 420 and first bus adaptor component 424a are far apart from memory subsystem 410 and second bus adaptor component 424b in device 400.

To address these limitations and disadvantages, another type of communication link that does not require a globally synchronous clock can be employed instead of the asynchronous data link.

Figure 5:
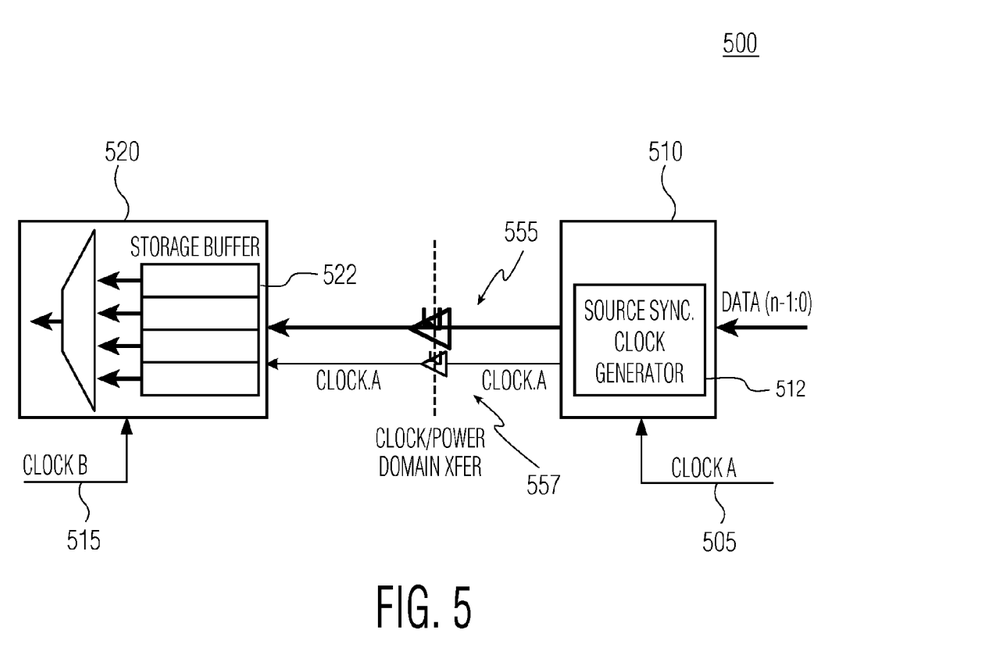
FIG. 5 illustrates an exemplary embodiment of a device having a source-synchronous data link.

FIG. 5 illustrates an exemplary embodiment of a device 500 having a source-synchronous data link 555. FIG. 5 shows the flow of data between source block 510 and destination block 520 that operate in different clock domains and power domains. Source block 510 is clocked by source clock "A" 505, and destination block 520 is clocked by destination (or "core") clock "B" 515.

For explanation, consider a case of one transaction transferring 4 elements of n bits from source block 510 to destination block 520. In device 500, source block 510 includes a source-synchronous clock generator 512 to provide a source clock to source-synchronous clock line 557, and destination block 520 includes buffer 522 for storing data received via source-synchronous data link 555. With the source-synchronous data link 555, only one data element crosses the clock/power domains at a time, together with source clock via source-synchronous clock line 557. Source clock of clock domain A is sent via source-synchronous clock line 557 to destination block 520 in clock domain B and it is used to write the data elements into storage buffer 522.

So in comparison to the device 200 using asynchronous data link 255, in device 500 with source-synchronous data link 555, the number of top-level wires is determined by the width of each element (n in our example) and is independent of the number of elements per transaction. So a total number of n+1 top-level wires cross the clock/power domains (one n-bit data element plus the associated source-synchronous clock line 557). Another important difference between asynchronous data link 255 and source-synchronous data link 555 is the timing closure constraints. For the asynchronous link 255, data crossing domains should be treated as multiple cycle paths with respect to destination-end clock "B" 215. For the source-synchronous link, only the relative skew between the data on source-synchronous data link 555 and the source clock on source-synchronous clock line 557 crossing domains needs to be constrained. Therefore the source-synchronous timing closure requirements both in terms of number of top level wires and timing constraints are better suited for the backend steps of SoC design.

Figure 6:
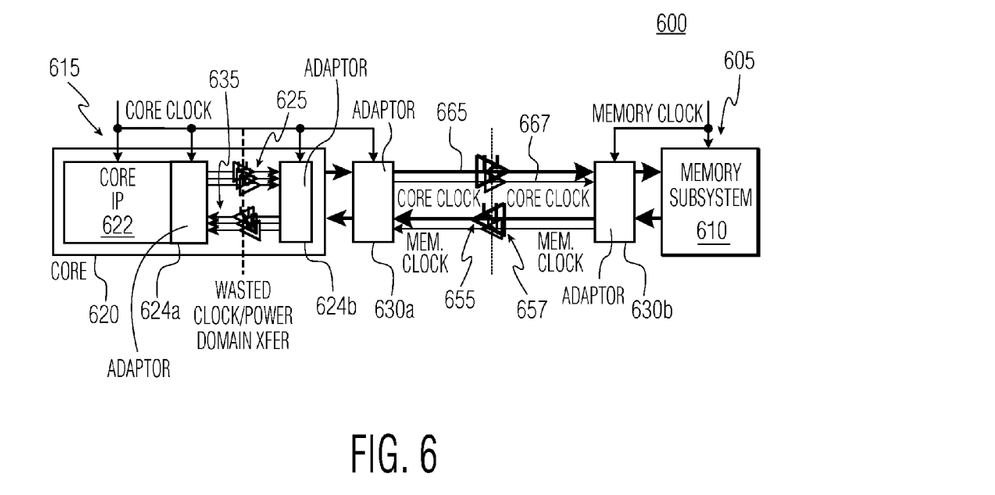
FIG. 6 illustrates an exemplary embodiment of a monolithic device employing an SoC design having a first clock domain crossing inside of a hard core and a second clock domain crossing outside of the hard core.

FIG. 6 illustrates an exemplary embodiment of a monolithic device 600 employing an SoC design having a first clock domain crossing inside of a hard core 620 and a second clock domain crossing outside of the hard core 620. Device 600 includes memory subsystem 610 and hard core 620. Hard core 620 is essentially the same as hard core 320 of device 300 in FIG. 3. In particular, hard core 620 includes a core IP element 622, a bus adaptor including a first bus adaptor component 624a and a second bus adaptor component 624b, and asynchronous data links 625/635 extending between first and second bus adaptor components 624a and 624b.

Device 600 also includes a bus adaptor including a first bus adaptor component 630a and a second bus adaptor component 630b, and source-synchronous data links 655 and 665 between memory subsystem 610 and hard core 620.

Memory subsystem 610 and second bus adaptor component 630b operate in a different clock domain and power domain than hard core 620 and first bus adaptor component 630a. Memory subsystem 610 and second bus adaptor component 630b are clocked by memory clock 605, while hard core 620 and first bus adaptor component 630a are clocked by core clock 615.

In device 600, first bus adaptor component 630a provides a source clock (e.g., the core clock 615) to source-synchronous clock line 657, and the destination end includes a buffer for storing data received via source-synchronous data link 655 and clocked in via the source clock on source-synchronous clock line 657. Meanwhile, second bus adaptor component 630b provides a source clock (e.g., memory clock 305) to source-synchronous clock line 667, and the destination end includes a buffer for storing data received via source-synchronous data link 665 and clocked in via the source clock on source-synchronous clock line 667.

This approach uses our original hard core and adds a source-synchronous link for the communication with the memory subsystem. The limited number of top-level wires and the easy to meet timing requirements of the source-synchronous link facilitates backend design steps (placement, routing and timing closure).

This approach illustrated in FIG. 6, however, introduces a disadvantage in terms of latency. The additional source-synchronous data link placed outside hard core 620 adds to the overall system latency. The clock and power domain provision offered by bus adaptor 624a/624b inside hard core 620 is wasted.

Figure 7:
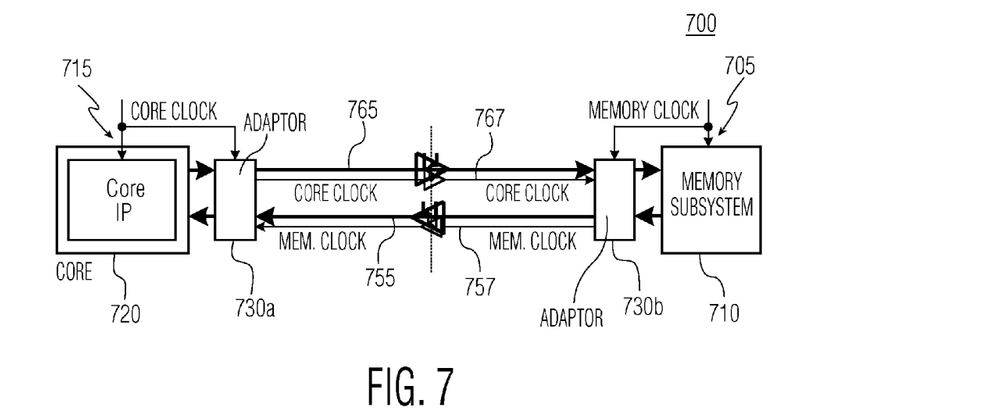
FIG. 7 illustrates an exemplary embodiment of a monolithic device employing an SoC design where a clock domain crossing is performed outside of a hard core using a source-synchronous data link.

FIG. 7 illustrates an exemplary embodiment of a monolithic device 700 employing an SoC design where a clock domain crossing is performed outside of a hard core 720 using source-synchronous data links 755 and 765. Device 700 includes memory subsystem 710, hard core 720, a bus adaptor including a first bus adaptor component 730a and a second bus adaptor component 730b, and source-synchronous data links 755 and 765 extending between first and second bus adaptor components 730a and 730b. Hard core 720 may include a processor such as a CPU, a 3D graphics processor, an audio processor, a control processor, etc. Memory subsystem 710 and second bus adaptor component 730b operate in a different clock domain and power domain than hard core (e.g., a CPU) 720 and first bus adaptor component 730a. Memory subsystem 710 and second bus adaptor component 730b are clocked by memory clock 705, while hard core 720 and first bus adaptor component 730a are clocked by core clock 415.

Bus adaptor 730a/730b serves a function of interfacing a specific bus structure presented by hard core (e.g., a CPU) 720 to operate with a general bus structure that may be utilized in device 700. Each source-synchronous data link 755/765 includes a total of n+1 lines, where n is the number of bits (e.g., 8) for each data element. Also, each source-synchronous data link 755/765 includes a level shifter for each of the n+1 lines.

With this approach, bus adaptor 730a/730b is delivered as a soft core (i.e., separated from hard core 720). Different bus adaptors can be employed to handle SoC-specific protocol adaptations without adding any extra latency. So the same hard core 720 can be connected to different memory subsystems. Furthermore, rather than having the n+1 level shifters in hard core 720, this approach puts them in bus adaptor 730a/730b such that they may be eliminated when not needed by a particular device 700 (e.g., when hard core 720 and memory subsystem 710 operate in the same power domain).

The arrangement of FIG. 7 provides a number of advantages. The backend design steps (placement, routing and timing closure) are simplified with the benefits of the source-synchronous communication in terms of: (1) fewer top-level wires; and (2) relaxed timing constraints (core clock only goes to the hard core and the associated adaptor and memory clock only goes to the memory subsystem and the associated adaptor). Also, latency, protocol friendliness and flexibility are addressed with bus adaptor 730a/730b being located outside of hard core 720. Bus adaptor 730a/730b performs bus protocol adaptation in conjunction with clock and power domain crossing. Also, bus adaptor 730a/730b may have the level shifters removed when not required by the SoC (e.g., when memory subsystem 710 and hard core 720 operate in a same Island of Power (IoP)).

Although the embodiments described above are particular beneficial in the context of an interface between a memory subsystem and a processor embodied as a hard core, it should be understood that the principles may be applied to other devices and applications where low latency communication is important. Also, although, for example, the embodiment shown in FIG. 7 employs two source-synchronous data links, in some devices a hard core may interface with more than two source-synchronous data links, or an interface may require only one source-synchronous data link (e.g., for a bi-directional data link).

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A monolithic device, comprising:
a first circuit operating with a first clock,
a second circuit embodied as a hard core operating with a second clock that is not synchronized with the first clock, and
a source-synchronous data link between the first circuit and the second circuit for communicating n-bit data elements between the first circuit and the second circuit, the source-synchronous data link including,
a set of n data lines for transporting the n-bit data elements between the first circuit and the second circuit, and
a source-synchronous clock line for transporting a source clock between the first circuit and the second circuit for clocking the n-bit data elements,
wherein the hard core does not include a bus interface adaptor for interfacing with the source-synchronous data link;
wherein the source-synchronous data link further comprises a plurality of level shifters for shifting voltage levels of data transported on the n data lines and voltage levels of the source clock transported on the source-synchronous clock line.

2. The device of claim 1, further comprising a first buffer for storing a plurality of the n-bit data elements in response to the source clock and for outputting the plurality of the n-bit data elements in response to the second clock.

3. The device of claim 2, further comprising a second buffer for storing a plurality of the n-bit data elements in response to a second source clock and for outputting the plurality of the n-bit data elements in response to the first clock.

4. The device of claim 1, further comprises a buffer for storing a plurality of the n-bit data elements in response to the source clock and for outputting the plurality of the n-bit data elements in response to the first clock.

5. The device of claim 1, further comprising a bus interface adaptor for interfacing the first circuit to the source-synchronous data link.

6. The device of claim 5, wherein the bus interface adaptor further comprises a buffer for storing a plurality of the n-bit data elements in response to the source clock and for outputting the plurality of the n-bit data elements in response to the first clock.

7. The device of claim 5, wherein the bus interface adaptor includes a first bus interface adaptor component in a first Island of Synchronicity (IoS), and a second bus interface adaptor component in a second IoS.

8. The device of claim 5, wherein the bus interface adaptor further comprises a buffer for storing a plurality of the n-bit data elements in response to the source clock and for outputting the plurality of the n-bit data elements in response to the second clock.

9. The device of claim 1, further comprising a bus interface adaptor for interfacing the hard core to the source-synchronous data link.

10. The device of claim 9, wherein the bus interface adaptor further comprises a buffer for storing a plurality of the n-bit data elements in response to the source clock and for outputting the plurality of the n-bit data elements in response to the second clock.

11. The device of claim 1, wherein the set of n data lines transports the n-bit data elements between the first circuit and the second circuit in a first direction and wherein the source-synchronous data link further comprises:
a second set of n data lines for transporting the n-bit data elements between the first circuit and the second circuit in a second direction opposite the first direction, and a second source-synchronous clock line for transporting a second source clock between the second circuit and the first circuit for clocking the n-bit data elements transported by the second set of n data lines.

12. A monolithic device, comprising:
a first circuit operating with a first clock,
a second circuit embodied as a hard core operating with a second clock that is not synchronized with the first clock, and
a source-synchronous data link between the first circuit and the second circuit for communicating n-bit data elements between the first circuit and the second circuit, the source-synchronous data link including,
a set of n data lines for transporting the n-bit data elements between the first circuit and the second circuit, and
a source-synchronous clock line for transporting a source clock between the first circuit and the second circuit for clocking the n-bit data elements,
wherein the hard core does not include a bus interface adaptor for interfacing with the source-synchronous data link,
further comprising a bus interface adaptor for interfacing the first circuit to the source-synchronous data link;
further comprising a first buffer for storing a plurality of the n-bit data elements in response to the source clock and for outputting the plurality of the n-bit data elements in response to the second clock.

13. The device of claim 12, further comprises a buffer for storing a plurality of the n-bit data elements in response to the source clock and for outputting the plurality of the n-bit data elements in response to the first clock.

14. The device of claim 12, wherein the bus interface adaptor further comprises a buffer for storing a plurality of the n-bit data elements in response to the source clock and for outputting the plurality of the n-bit data elements in response to the first clock.

15. The device of claim 12, wherein the bus interface adaptor includes a first bus interface adaptor component in a first Island of Synchronicity (IoS), and a second bus interface adaptor component in a second IoS.

16. A monolithic device, comprising:
a first circuit operating with a first clock,
a second circuit embodied as a hard core operating with a second clock that is not synchronized with the first clock, and
a source-synchronous data link between the first circuit and the second circuit for communicating n-bit data elements between the first circuit and the second circuit, the source-synchronous data link including,
a set of n data lines for transporting the n-bit data elements between the first circuit and the second circuit, and
a source-synchronous clock line for transporting a source clock between the first circuit and the second circuit for clocking the n-bit data elements,
wherein the hard core does not include a bus interface adaptor for interfacing with the source-synchronous data link,
further comprising a bus interface adaptor for interfacing the hard core to the source-synchronous data link; and
wherein the set of n data lines transports the n-bit data elements between the first circuit and the second circuit in a first direction and wherein the source-synchronous data link further comprises:
a second set of n data lines for transporting the n-bit data elements between the first circuit and the second circuit in a second direction opposite the first direction, and
a second source-synchronous clock line for transporting a second source clock between the second circuit and the first circuit for clocking the n-bit data elements transported by the second set of n data lines.

17. The device of claim 16, further comprising a bus interface adaptor for interfacing the first circuit to the source-synchronous data link.

18. The device of claim 16, wherein the bus interface adaptor further comprises a buffer for storing a plurality of the n-bit data elements in response to the source clock and for outputting the plurality of the n-bit data elements in response to the second clock.

* * * * *